United States Patent
Zhao et al.

(10) Patent No.: US 11,373,023 B2
(45) Date of Patent: Jun. 28, 2022

(54) PARAMETRIC EQUIVALENT MAGNETIC NETWORK MODELING METHOD FOR MULTI OBJECTIVE OPTIMIZATION OF PERMANENT MAGNET MOTOR

(71) Applicant: JIANGSU UNIVERSITY, Zhenjiang (CN)

(72) Inventors: Wenxiang Zhao, Zhenjiang (CN); Donghui Cao, Zhenjiang (CN); Jinghua Ji, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/414,964

(22) PCT Filed: Jun. 24, 2020

(86) PCT No.: PCT/CN2020/097904
§ 371 (c)(1),
(2) Date: Jun. 17, 2021

(87) PCT Pub. No.: WO2021/237848
PCT Pub. Date: Dec. 2, 2021

(65) Prior Publication Data
US 2022/0043950 A1 Feb. 10, 2022

(30) Foreign Application Priority Data
May 27, 2020 (CN) .......................... 202010459359.0

(51) Int. Cl.
*G06F 30/17* (2020.01)
*G06F 30/23* (2020.01)
(Continued)

(52) U.S. Cl.
CPC .............. *G06F 30/23* (2020.01); *G06F 30/17* (2020.01); *H02K 15/03* (2013.01); *H02K 41/031* (2013.01);
(Continued)

(58) Field of Classification Search
CPC ...... G06F 30/23; G06F 30/17; G06F 2111/06; H02K 15/03; H02K 41/031; H02K 2213/03
See application file for complete search history.

(56) References Cited

U.S. PATENT DOCUMENTS

| | | | |
|---|---|---|---|
| 4,221,615 A * | 9/1980 | Shine | H01F 1/0063 148/120 |
| 10,216,873 B2 * | 2/2019 | Lagache | G06F 30/23 |
| 2017/0063188 A1 * | 3/2017 | Lipo | H02K 1/2766 |
| 2019/0185083 A1 * | 6/2019 | Wang | H02K 41/03 |

(Continued)

FOREIGN PATENT DOCUMENTS

| CN | 107565782 A | 1/2018 |
|---|---|---|
| CN | 107612256 A | 1/2018 |

(Continued)

OTHER PUBLICATIONS

Ding et al. ("A Novel Mesh-Based Equivalent Magnetic Network for Performance Analysis and Optimal Design of Permanent Magnet Machines" IEEE, pp. 1337-1346, 2019) (Year: 2019).*

(Continued)

*Primary Examiner* — Kibrom K Gebresilassie
(74) *Attorney, Agent, or Firm* — Bayramoglu Law Offices LLC

(57) ABSTRACT

A parametric equivalent magnetic network modeling method for multi-objective optimization of permanent magnet motor is provided. Firstly, the disordered region and the regular region of the magnetic flux lines in the motor are divided, and the dynamic mesh model of the disordered
(Continued)

region and the magnetic circuit model of the ordered region is constructed. Then, the dynamic mesh model and the magnetic circuit model are connected, and the parametric equivalent magnetic network model of the motor is established. The nonlinear matrix is used to solve the equations, and the magnetic potential of each node is solved to obtain the torque characteristics of the motor. Then, the variable sensitivity analyses of the average torque and torque ripple are carried out by using the parametric equivalent magnetic network model, and the response surface models of the average torque and torque ripple are established by selecting the high sensitivity variables.

11 Claims, 11 Drawing Sheets

(51) Int. Cl.
    *H02K 15/03*     (2006.01)
    *H02K 41/03*     (2006.01)
    *G06F 111/06*     (2020.01)

(52) U.S. Cl.
    CPC ...... *G06F 2111/06* (2020.01); *H02K 2213/03* (2013.01)

(56) References Cited

U.S. PATENT DOCUMENTS

2019/0280539 A1*   9/2019   Kremer ................ H02K 1/2766
2021/0364824 A1*  11/2021   Aschwanden ........... G02B 3/14

FOREIGN PATENT DOCUMENTS

| | | |
|---|---|---|
| CN | 109600006 A | 4/2019 |
| CN | 109684775 A | 4/2019 |
| CN | 110705088 A | 1/2020 |
| CN | 110765649 A | 2/2020 |

OTHER PUBLICATIONS

Liu et al ("Modular Reluctance Network Simulation of Linear Permanent Magnet Vernier Machine Using mesh generation Methods" IEEE, pp. 5323-5331, 2017) (Year: 2017).*
Huang et al ("Dynamic Reluctance Mesh Modeling and Losses Evaluation of Permanent Magnet Traction Motor" IEEE, pp. 1-4, 2017) (Year: 2017).*
Liu et al, Modular Reluctance Network Simulation of Linear Permanent Magnet Vernier Machine Using mesh generation Methods, IEEE, pp. 5323-5331 (Year: 2017).*
Ding et al, A Novel Mesh-Based Equivalent Magnetic Network for Performance Analysis and Optimal Design of Permanent Magnet Machines, IEEE, pp. 1337-1346 (Year: 2019).*

* cited by examiner

PARAMETRIC EQUIVALENT MAGNETIC NETWORK MODELING METHOD FOR MULTI OBJECTIVE OPTIMIZATION OF PERMANENT MAGNET MOTOR

CROSS REFERENCE TO THE RELATED APPLICATIONS

This application is the national phase entry of International Application No. PCT/CN2020/097904, filed on Jun. 24, 2020, which is based upon and claims priority to Chinese Patent Application No. 202010459359.0, filed on May 27, 2020, the entire contents of which are incorporated herein by reference.

TECHNICAL FIELD

The present invention relates to a parametric equivalent magnetic network modeling method for multi-objective optimization of a permanent magnet motor, belonging to the field of electromagnetic field calculation.

BACKGROUND

Surface mounted permanent magnet motor has excellent dynamic performance, which is very suitable for DC/AC motor in servo system. The key to its performance lies in the means of optimization. The traditional single objective optimization aims at one variable at a time, which is easy to operate and has a certain effect, but it can not avoid the impact conflict between multiple parameters. Multi objective optimization method is often used to improve the interaction between parameters, which is solved by Pareto optimality set. Multi objective optimization can balance the selected parameters and optimize various performance parameters to avoid the influence of multiple factors. However, due to the use of finite element analysis (FEA), multi-objective optimization has the disadvantages of large time consumptions and complicated operations. Therefore, the response surface method is proposed to reduce the excessive finite element analysis by applying the surrogate model. However, due to the multi-dimensional nature of the sampling points, the global optimization still needs too much simulation time.

The equivalent magnetic network (EMN) model, as an alternative method of finite element analysis, has the advantages of fast analysis speed and low calculation cost. By considering the influence of spatial harmonic content, the accuracy of EMN model based on mesh method is comparable to that of finite element analysis. However, in the aspect of motor structure optimization, EMN model has not been applied innovatively. Through the parametric equivalent magnetic network modeling counts on the surface mounted permanent magnet motor, it does not need to rely on repeated modeling operation. Its calculation principle is simple, precision is high, and simulation time is short, which brings high design efficiency. It can quickly solve the electromagnetic parameters such as motor torque under multi variables, and realize the high efficiency performance optimization design of surface mounted permanent magnet motor by using multi-objective optimization algorithm.

SUMMARY

The purpose of the present invention is to provide a parametric equivalent magnetic network modeling method for multi-objective optimization of permanent magnet motor. It mainly includes dynamic mesh permeance subdivision of disordered magnetic flux lines region in the motor, permeance equivalence of magnetic circuit in regular magnetic flux lines region, and establishment and solution of magnetic network matrix equation. The sensitivity analyses of multiple structural variables and the response surface model are completed by using the parametric equivalent magnetic network model. The optimal parameter combination is determined by using the multi-objective optimization algorithm to realize the fast multi-objective optimization of permanent magnet motor.

To achieve the above purpose, the technical scheme adopted by the present invention is that a parametric equivalent magnetic network modeling method for multi-objective optimization of surface mounted permanent magnet motor, which includes the following steps:

Step 1, the disordered region and the regular region of the magnetic flux lines are divided in the permanent magnet motor;

Step 2, the dynamic mesh model of the disordered region of the magnetic flux lines is constructed in the permanent magnet motor;

Step 3, the magnetic circuit model of the regular region of the magnetic flux lines in the permanent magnet motor is constructed;

Step 4, the dynamic mesh model and the magnetic circuit model are connected to establish the parametric equivalent magnetic network model of the permanent magnet motor;

Step 5, the nonlinear matrix is used to solve the equations, and the magnetic potential of each node is solved to further obtain the torque characteristics of the permanent magnet motor;

Step 6, the optimization variables are selected and the optimization objective is determined, and the parametric equivalent magnetic network model is used to complete the parameter sensitivity analysis;

Step 7, high sensitivity variables are selected to establish response surface models of average torque and torque ripple respectively;

Step 8, the response surface model is substituted into the multi-objective optimization algorithm to obtain the Pareto front and determine the optimal parameter combination.

Further, the surface mounted permanent magnet motor is a 48 slot/44 pole three-phase permanent magnet motor, including a stator, a rotor and air gap. The stator includes stator yoke, stator teeth, stator tooth pole shoes, stator slots between the stator teeth and armature windings in the stator slots. The stator core is made of silicon steel sheet, and the armature winding is wound in a centralized way with fractional slots; the air gap is between the stator and the rotor; the rotor is a coreless cylindrical structure, which is composed of rotor permanent magnets and shaft. The surface of the cylindrical shaft is slotted and attached with permanent magnet, and the section of the surface attached permanent magnet is rectangular, and the permanent magnet Halbach array is evenly arranged on the surface of the shaft. The permanent magnets are embedded in the slot on the surface of the rotating shaft, so as to position and install the auxiliary permanent magnets. The motor rotating shaft is made of non-magnetic material, which is a solid cylinder. Its surface has a slot for positioning, and is coaxial connected with the rotor permanent magnets.

Further, in Step 1, the magnetic flux distribution cloud diagram of the motor is obtained by using the finite element software. The disordered region of the internal magnetic flux lines of the motor is mainly concentrated in the stator pole shoes and the air gap with many spatial harmonics in this area. The regular area of the magnetic flux lines of the motor is mainly concentrated in the stator yoke and the stator teeth. Because the rotor shaft is made of non-magnetic material, the distribution of magnetic flux lines can be equivalent as the distribution of magnetic flux lines in the air, so the model is not established.

Further, in Step 2, the specific process of dynamic mesh modeling for the disordered magnetic flux lines in the motor is as follows: according to the pole shoe size and air gap size of the motor, a cross-shape type permeance mesh with variable length and width is used for mesh generation. The influence of magnetic flux leakage is considered at the same time. The mesh generations for the pole shoes and the air gap between the pole shoes are carried out in the circumferential direction at the same time, and the mesh distribution of the two places is strictly limited to their own characteristics. The size of the region boundary is set strictly according to the respective region specifications. When the number is fixed, the change of the pole shoe structure only affects the mesh shape of the corresponding region. For the air gap part modeling, the number and width of the mesh of the circumferential should be consistent with the upper pole shoes, and the mesh height should be judged according to the air gap length. When the mesh width of the pole shoe changes, the width of the mesh in the air gap needs to be updated to keep the constant permeance connection between the upper and lower meshes.

Further, in Step 3, the specific process of magnetic circuit modeling in the region of regular magnetic flux lines in the motor is as follows: for the stator teeth and yoke, the general magnetic circuit models are used to conduct the equivalent permeance. One single tooth is equivalent to one single permeance. And the stator yoke is equivalent by segments according to the number of teeth, so as to establish the connection permeance between the teeth. For the rotor permanent magnets, the Halbach array magnetization method is used. The radial permeance is established in the main permanent magnets, and the tangential permeance is established in the auxiliary permanent magnets. The permeance of the permanent magnets are connected at the node in turn according to the flow directions of Halbach array magnetic flux lines.

Further, in Step 4, the bottom nodes of stator teeth permeance are connected with the upper nodes of stator pole shoe mesh in turn, and the upper nodes of air gap mesh between stator pole shoes are vacant. The bottom mesh nodes of air gap mesh are connected with the main permanent magnet permeance in rotor Halbach array according to the corresponding relationships. And it is judged whether the mapping area of main permanent magnets on air gap mesh is larger than half of the area. When the rotor position is updated, it is necessary to re-judge the rotation angle and reset the connection between the air gap mesh and the main permanent magnets.

Further, in Step 5, the matrix equation of magnetic permeance matrix G, magnetomotive force matrix F and magnetic flux matrix Φ is established, and the magnetic induction intensity between two points is calculated according to the node magnetic potential difference with the formula $B_{i,j}=(F(i)-F(j))\cdot G(i,j)/S_{i,j}$. The iron core nonlinear parameter B-H curve is introduced, and the permeability value is obtained by interpolation in the iterative calculation. The permeability is updated by using the over relaxation iterative algorithm, and the new value is weighted with the last calculated value. When the difference between the two iterations $\Delta B \leq 0.5\%$, it can be considered that the iteration has converged and the rotor position is updated for the next rotor position angle. After completing the calculation of an electrical angle cycle, the electromagnetic parameters such as the motor flux linkage Φ and the back EMF E are calculated through the tooth flux density. Under the load condition, the sinusoidal currents are injected to the armature winding to generate the sinusoidal alternating tooth magnetomotive force. Then, the output torque of the motor can be calculated.

Further, in step 6, eight parameter variables including stator yoke thickness, stator tooth width, stator tooth length, pole shoe height, slot width, main permanent magnet length, auxiliary permanent magnet width and pole arc coefficient are selected. By changing the permeability value of the magnetic circuit and adjusting the shape of the permeance mesh, the variable sensitivity analyses of the average torque and torque ripple are carried out by using the parametric equivalent magnetic network model. Four variables with high sensitivity were identified.

Further, in Step 7, the Box-Behnken design test method is used to select four high sensitivity variables for 29 times of sampling, and the average torque and torque ripple of 29 parameter combination methods are calculated in the magnetic network model. The response surface models of average torque and torque ripple are generated in Design Expert software. The more the multivariate correlation coefficient $R^2$ is close to 1, the smaller the p value is, the higher the accuracy of the model is. Further, the numbers of variables in the response surface models are adjusted according to $R^2$ and p value to improve the fitting accuracy of the model.

Further, in Step 8, the response surface models of average torque and torque ripple are used to import the multi-objective differential evolution algorithm based on multi-objective differential evolution with ranking-based mutation operator (MODE-RMO). Through mutation, crossover and selection, the external files of the solution are divided into branches, and the average distance between the two solutions is analyzed by using crowding distance so as to ensure that the best individual solution will survive to the next iteration. Finally, the Pareto front of the set of non-dominated solutions is obtained, and the optimal non-dominated solution is determined by the constraint of optimization objective function.

The present invention has the following beneficial effects:

1. In the present invention, the mesh generation and magnetic circuit permeance model are respectively used for the comprehensive modeling of the surface mounted permanent magnet motor. The high accuracy of the finite element method and the low consumption of the magnetic circuit method are considered at the same time, which is helpful to improve the accuracy and efficiency of the equivalent magnetic network calculation.

2. In the present invention, a cross type permeance mesh with adjustable length and width is used for local subdivision, and the mesh shape in the modeling area is changed equivalently when the structure of the modeling area changes. This feature can avoid repeated modeling when the parameters change, and improve the generality and dynamics of the model.

3. In the present invention, the meshes in the air gap area are fixed with the meshes in the pole shoe area. When the pole shoe structure affects the pole shoe meshes, the air gap meshes are adjusted with the same width to ensure the stability of the permeance connection relationship.

4. In the present invention, the connection relationships between the meshes in the air gap area and the rotor permanent magnets are judged by the mapping area, which avoid the error of adjusting the air gap permeance according to the mapping area, and help to improve the accuracy of model calculation.

5. In the present invention, the multi-objective optimization design is carried out by using the equivalent magnetic network model under adjustable parameters with short simulation time and high design efficiency. The electromagnetic parameters such as motor torque are quickly solved under the multi-variables, which is conducive to the efficient realization of the structure optimization design of the surface mounted permanent magnet motor.

BRIEF DESCRIPTION OF THE DRAWINGS

FIGS. 6A-6B are schematic diagrams of the dynamic mesh change when the parameters of the present invention change, wherein FIG. 6A shows the initial mesh structure, and FIG. 6B shows the parametric structure adjustment;

FIGS. 7A-7E are schematic diagrams of structural parameters, sensitivity analysis, response surface and Pareto front in the multi-objective optimization process, wherein FIG. 7A is a schematic diagram of the structural parameters of the multi-objective optimization process, FIG. 7B is a comparison chart of single sensitivity and comprehensive sensitivity analysis of selected variables, FIG. 7C and FIG. 7D are the interaction diagrams of tooth width and slot-opening width in the obtained response surface models, and FIG. 7E is a schematic diagram of the generated Pareto front;

FIGS. 8A-8E are schematic diagrams of comparison of magnetic network, finite element and experimental results before and after optimization of the motor used in the present invention, wherein FIG. 8A is the schematic diagram of no-load back EMF comparison before and after optimization, FIG. 8B is the schematic diagram of the comparison with the experimental no-load back EMF, FIG. 8C is a schematic diagram of cogging torque comparison before and after optimization, which verifies the reduction of cogging torque, FIG. 8D is a schematic diagram of torque comparison before and after optimization, and FIG. 8E is a schematic diagram of the measured torque, showing the measured torque under rated load;

DETAILED DESCRIPTION OF THE EMBODIMENTS

The technical scheme in the embodiment of the present invention will be described clearly and completely in combination with the drawings in the embodiment of the present invention.

Figure 1:
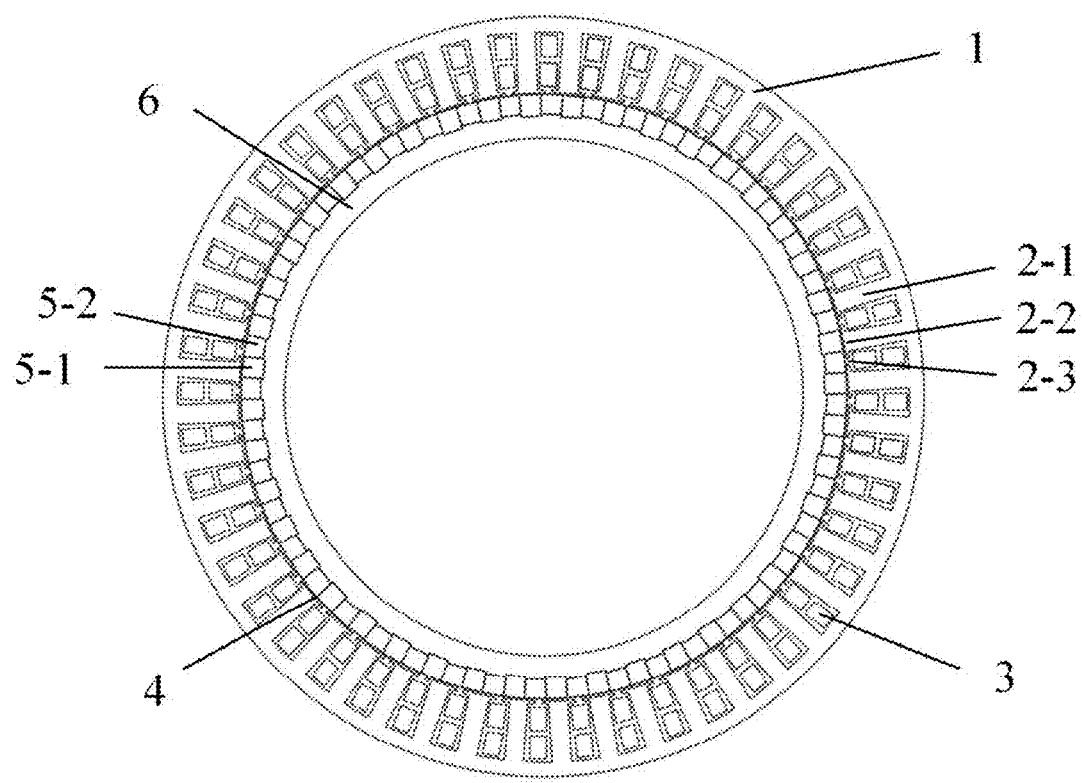
FIG. 1 is a 2D structure diagram of the motor used in the present invention.

In order to explain the beneficial effect of the present invention more simply and clearly, a specific surface mounted permanent magnet motor is described in detail as follows: FIG. 1 is the topology structure diagram of the motor, in which 1 is the stator yoke and 2-1 is the stator teeth; 2-2 is the stator teeth pole shoe, 2-3 is the air gap between the stator teeth pole shoe, 3 is the winding, 4 is the air gap between the stator and rotor. 5-1 is the main permanent magnet in Halbach array, 5-2 is the auxiliary permanent magnet in Halbach array, and 6 is the non-magnetic rotating shaft. The embodiment of the present invention is a 48 slot/44 pole three-phase motor, which is composed of stator, air gap, rotor permanent magnet and rotating shaft. The stator includes stator yoke, stator tooth, stator tooth pole shoe, stator slot and armature winding. The material of stator core is silicon steel sheet B20AT1500, and the armature winding is made of copper. The air gap is between the stator and the rotor, and the thickness of the air gap is 1 mm. The rotor is a cylindrical structure without iron core, which is only composed of permanent magnets and shaft. The surface of the cylindrical shaft is slotted and coated with N42UH permanent magnets. The cross section of the surface coated permanent magnet is approximately rectangular, and the Halbach array of permanent magnet is evenly arranged on the surface of the shaft. The motor shaft is made of non-magnetic material stainless steel 304, which is a solid cylindrical shape. The surface of the motor shaft has a slot for positioning and is coaxial connected with the rotor.

Figure 9:
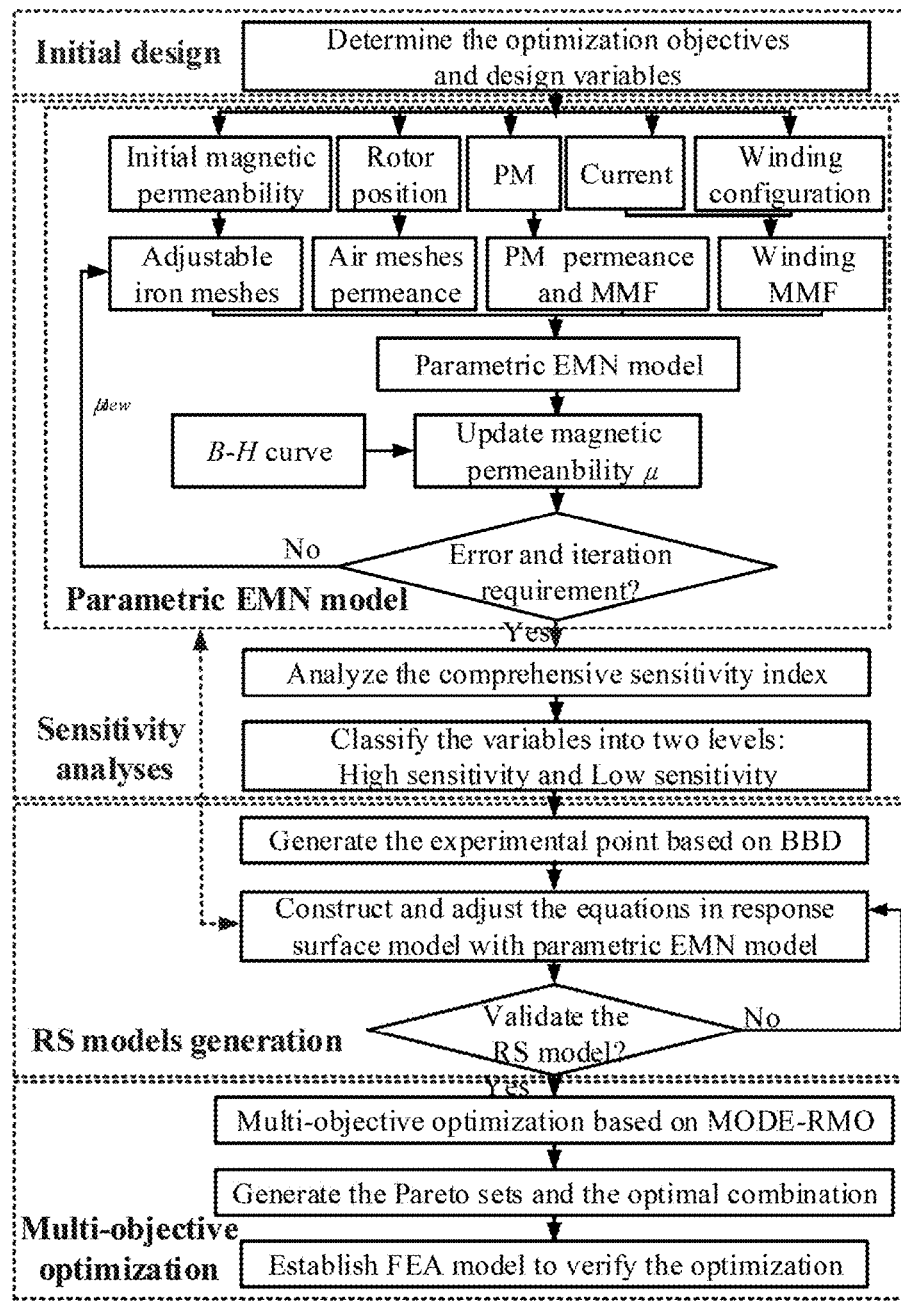
FIG. 9 is a flow chart of the modeling method and optimization process of the present invention.

As shown in FIG. 9, the flow chart is divided into the following steps:

Step 1, the disordered region and the regular region of the magnetic flux lines are divided in the permanent magnet motor.

Figure 2:
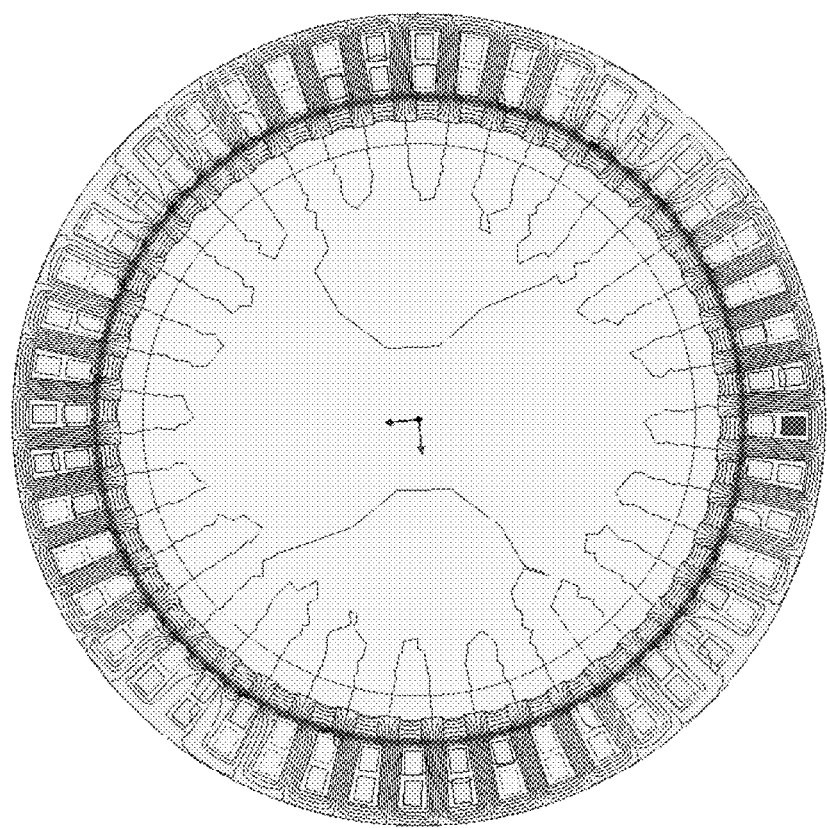
FIG. 2 is an analysis diagram of the magnetic flux lines of the motor used in the present invention.
Figure 3:
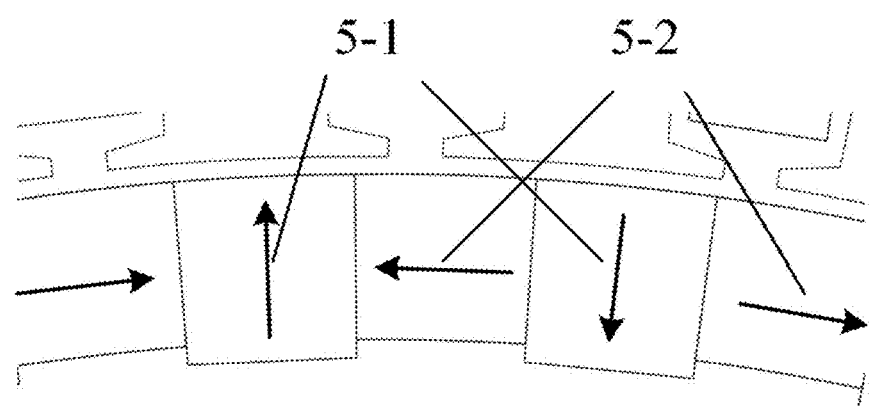
FIG. 3 is a structural diagram of the magnetization direction of the permanent magnet of the motor.

FIG. 2 is the analysis diagram of the magnetic flux line of the motor used in the embodiment of the present invention. It can be seen from the distribution of the magnetic flux lines that the disordered region of the magnetic flux lines in the motor is mainly concentrated in the air gap between the stator and rotor and the stator tooth pole shoe, which is the key area of electromagnetic energy conversion. The magnetic flux lines of the motor is distorted by the uneven air permeance, so the trends of the magnetic flux lines are complex and irregular, and there are lots of inter tooth magnetic leakage and spatial harmonics. The regular regions of the magnetic flux lines in the motor are mainly concentrated in the stator teeth, stator yoke and rotor permanent magnets. These regions are the path of the flux to the air gap, which have regular shape and basically no flux leakage. The trends of the magnetic flux lines are regular, and the magnetic flux lines are in the same direction.

Step 2, the dynamic mesh model of the disordered region of the magnetic flux lines is constructed in the permanent magnet motor.

Figure 4:
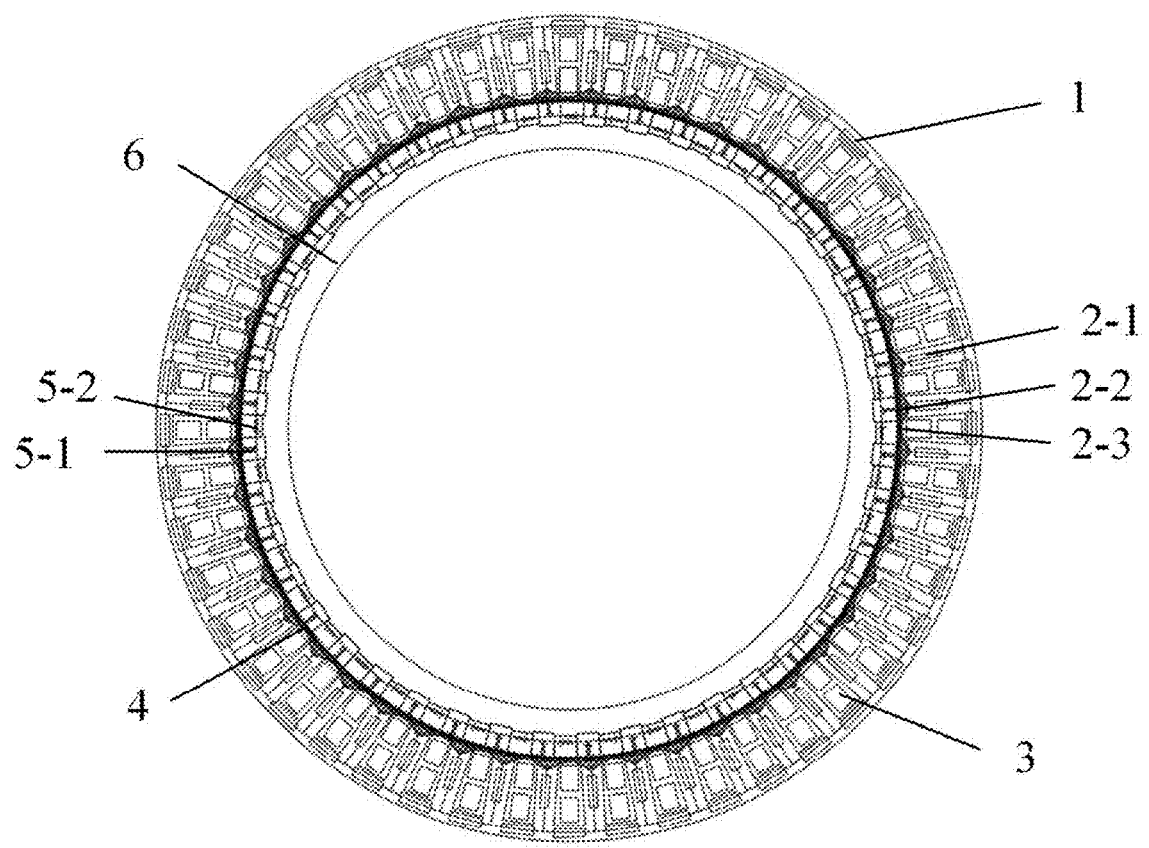
FIG. 4 is the structure diagram of the magnetic network model of the dynamic mesh generation of the present invention.
Figure 5:
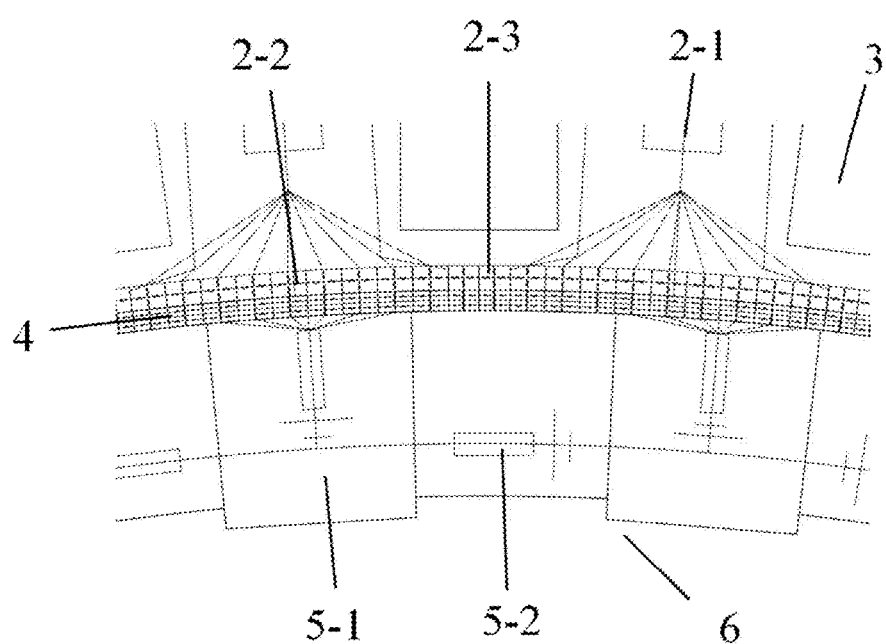
FIG. 5 is a local enlarged structure diagram of the magnetic network model of the dynamic mesh generation of the present invention.

FIG. 4 is the structure diagram of the magnetic network model of the dynamic mesh generation of the present invention, and FIG. 5 is the partial enlarged structure diagram of the magnetic network model of the dynamic mesh generation of the present invention. According to the actual size of the modeling area, the magnetic flux leakages between teeth and the magnetic flux loops are considered including the pole shoe height, pole shoe length, slot-opening, air gap outer diameter, air gap height, etc. Different mesh generation schemes are selected accordingly in different regions. Among them, the dynamic adjustable cross-shape permeance meshes are the key in the model, and the calculation formulae of the tangential permeance $G_t$ and the radial permeance $G_h$ are as follows:

$$\begin{cases} G_t = \dfrac{2\mu_0 \mu_r L_a w_{cell}}{h_{cell}} \\ G_h = \dfrac{2\mu_0 \mu_r L_a h_{cell}}{w_{cell}} \end{cases} \quad (1)$$

where $L_a$ is the axial length, $w_{cell}$ is the width of mesh, $h_{cell}$ is the height of the cell, $\mu_0$ and $\mu_r$ are the vacuum permeability and relative permeability separately.

The complex magnetic field regions of the stator are the air gap 2-3 between the stator tooth pole shoe and the pole shoe 2-2. The height of the mesh is equal to $h_1$, and the width of the mesh is divided equally by the width of the modeling area. There are two equal width meshes in one row in the air gap between the pole shoes, and 9 equal-width meshes in one row in the pole shoes. The 9 upper nodes of the mesh in the pole shoes are connected with the lower nodes of the stator tooth 2-1 in turn, and the two upper nodes of the air gap meshes between the pole shoes are not connected.

Air gap 4 is an important place for energy conversion of permanent magnet motor, and it is also the most complex area of magnetic field. The air gap 4 is divided into two layers through reasonable design. The number of air gap meshes is the same as that of stator lower layer meshes. The total number of air gap meshes is the least common multiple 528 of 48 slots/44 poles, which ensures the symmetry and equality of meshes. The number and width of the air gap meshes and the lower stator mesh are consistent, which ensures that the upper air gap meshes are connected with the lower stator meshes. On the other hand, the lower meshes of the air gap are connected with the permanent magnets of the rotor. The Halbach array of permanent magnet on the rotor is composed of main permanent magnet 5-1 and auxiliary permanent magnet 5-2. The radial magnetization of the main permanent magnet 5-1 and the tangential sprint of the auxiliary permanent magnet 5-2 play the role of enhancing the unilateral air gap magnetic field. For the Halbach array of permanent magnet, the auxiliary permanent magnet 5-2 is not connected with the lower nodes of mesh in the air gap 4, because the auxiliary permanent magnets only generate tangential magnetic flux lines in practice, and only the main permanent magnets 5-1 which generates tangential magnetization connect all the meshes in air gap 4 within the width of the main permanent magnets 5-1.

Step 3, the magnetic circuit model of the regular region of the magnetic flux lines in the permanent magnet motor is constructed.

For the stator of the motor, the trends of the magnetic flux lines in the stator yoke 1 and the stator teeth 2-1 are basically with no flux leakage, and the magnetic flux lines are in the same direction. For the stator teeth, the traditional permeability model is established according to its structural parameters:

$$G = \mu \frac{S}{l} = \mu_0 \mu_r \frac{w L_a}{l_t} \quad (2)$$

where $\mu$ is iron core permeability, S is the magnetization direction cross section, l is the magnetization length, w is the width of structure.

For the magnetic circuit permeance equivalence of stator yoke, the connected permeance between teeth are established based on the number of teeth, and the calculation formulae are the same as that of teeth permeance. The nodes at both ends of yoke permeance are connected with the corresponding upper nodes of tooth permeance. For the rotor permanent magnets, according to Halbach array magnetization direction, the permeance of each permanent magnet block is equivalently processed. The radial permeance is established in the main permanent magnets, and the tangential permeance are established in the auxiliary permanent magnets. The calculation formulae are the same as that of the stator permeance. The permanent magnets are approximately regarded as air permeability, and the relative permeability is set to 1. At the same time, considering the path of permeance, according to the law of Halbach array magnetic flux lines direction, the lower nodes of radial permeance of the main permanent magnets are connected with the tangential permeance nodes of the auxiliary permanent magnets to form the permeance network.

Step 4, the dynamic mesh model and the magnetic circuit model are connected to establish the parametric equivalent magnetic network model of the permanent magnet motor.

Because the dynamic meshes are used in the stator pole shoe areas, the permeance models of stator tooth 2-1 are connected with the first row of 9 meshes of corresponding lower tooth pole shoe 2-2, and the relationships are fixed. At the same time, the meshes of lower tooth pole shoe 2-2 are connected with the meshes of air gap 4. For the meshes in air gap 4, the connections between the air gap mesh and the mesh of stator pole shoe 2-2 are also fixed. Therefore, when the rotor rotates along the z-axis, only the connections between the air gap and the rotor change with the rotation angle. Therefore, the key to establish the rotating magnetic network model is to determine the connection between the rotor Halbach array of permanent magnet and the air gap meshes. When the rotor rotates to a certain angle, the radial permeance nodes of the main permanent magnet 5-1 are respectively connected with the corresponding permeance in the mapping area, and there are about 6 to 7 air gap meshes connected with them in its range, and there are about 6 to 7 air gap meshes in the auxiliary permanent magnet range, which remain empty. Every time the rotor permanent magnet rotates an angle step, the mesh nodes of air gap 4 connected with the main permanent magnet 5-1 will change, and the connection relationship between the rotor main permanent magnet permeance and the air gap mesh needs to be constantly updated during the motor rotation.

Figure 6A:
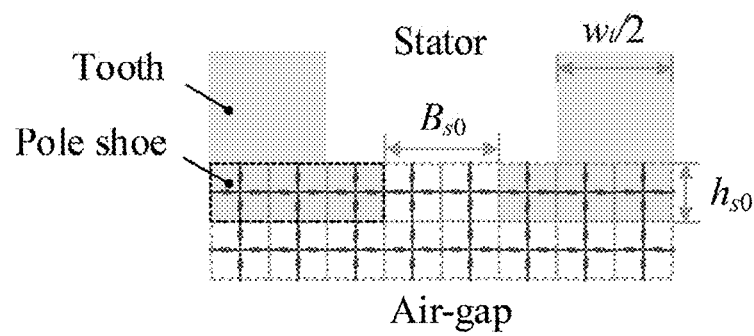
Figure 6B:
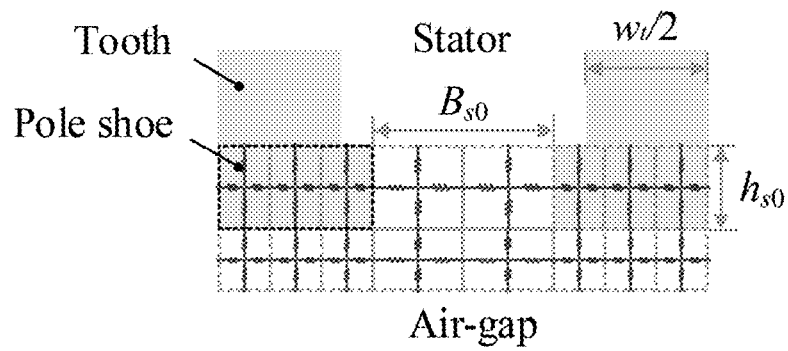

FIGS. 6A-6B are schematic diagrams of the dynamic mesh change when the parameters of the present invention change. When the equivalent magnetic network model of the motor is established through the combination of mesh and magnetic circuit model, its parameterization function can be realized by dynamically adjusting the mesh size and magnetic circuit permeance. For the parametric mesh adjustment, it can realize the dynamic adjustment of slot width, pole shoe height, air gap length and other variables. As shown in FIGS. 6A-6B, when the height of the pole shoe increases, the height of the whole row of meshes in the pole shoe layer increases to match the new pole shoe height. At the same time, the width of the mesh in the slot-opening becomes longer and the width of the mesh in the pole shoe shortens because the width of the slot-opening becomes larger and the length of the pole shoe is reduced. When the stator mesh is dynamically adjusted according to the parameterization requirements, it is necessary to ensure the unity of the mesh and the boundary of the modeling area, that is, the mesh that coincides with the boundary of the modeling area should ensure the boundary can not be displaced. At the same time, the height and width of all meshes in the region are equally divided, which keeps the equality of mesh models and avoids the disadvantages of repeated modeling in variable adjustment. In addition, when the mesh width of the stator part changes, it is necessary to adjust the mesh width in the air gap to ensure that the mesh width of the upper and lower regions are consistent, so as to realize the mesh permeance fixed connection. For the parameter magnetic circuit permeance adjustment, it can realize the dynamic adjustment of stator yoke thickness, stator tooth width, stator tooth length, permanent magnet height, pole arc coefficient and other variables. The parameterization of the trend of the magnetic flux lines in this region can be realized directly by adjusting the cross-sectional area or length in the magnetic permeance calculation formulae, which only changes the magnetic permeance value of some nodes, and does not affect the judgment of the node connection relationship.

Step 5, the nonlinear matrix is used to solve the equations, and the magnetic potential of each node is solved to further obtain the torque characteristics of the permanent magnet motor.

There are 4456 nodes in the parametric magnetic equivalent magnetic model. According to the nodal flux law in the magnetic field, the permeance matrix G, the magnetomotive force matrix F, and the flux matrix $\Phi$ are connected, and the permeance matrix equation is established as follows:

$$G \cdot F = \Phi \quad (3)$$

The magnetomotive force matrix F includes the magnetomotive force generated by permanent magnet and the magnetomotive force of winding. When the winding magnetomotive force is set to 0 at no load, the calculation formula is as follows:

$$F = Ni \quad (4)$$

where N is the number of turns, i is the winding current.

By expanding formula (3) into matrix form, the formula can be expressed as follows:

$$G = \begin{bmatrix} G(1,1) & \cdots & G(1,4456) \\ \vdots & \ddots & \vdots \\ G(4456,1) & \cdots & G(4456,4456) \end{bmatrix}_{4456 \times 4456}, \text{and}$$

$$\begin{cases} G(i,i) \geq 0, G(i,j) \leq 0 \quad i \neq j \\ G(i,i) = -\sum_{j=1, j \neq i}^{4456} G(i,j) \\ G(i,j) = G(j,i) \quad i \neq j \end{cases}$$

$$F = [F(1) \ \cdots \ F(4456)]^T$$

$$\Phi = [\Phi(1) \ \cdots \ \Phi(4456)]^T$$

The B-H curve parameters of the ferromagnetic material B20AT1500 used in the motor are imported, and the B-H curve is linearly interpolated:

$$\begin{cases} H = H_n + (H_{n+1} - H_n) \dfrac{B - B_n}{B_{n+1} - B_n} \\ \mu_{new} = \dfrac{B}{H} \end{cases} \quad (5)$$

where H is the magnetic field density, B is the magnetic flux density, $H_{curve}(n)$ and $B_{curve}(n)$ represent the previous interpolating points, and $H_{curve}(n+1)$ and $B_{curve}(n+1)$ represent the next interpolating points based on curvilinear points.

Furthermore, the over relaxation iterative algorithm is used to solve the matrix equation:

$$F_i^{(k+1)} = F_i^{(k)} + \frac{w}{G(i,i)} \cdot \left[ -\sum_{j=1}^{i-1} G(i,j) F_j^{(k+1)} - \sum_{j=i}^{n} G(i,j) F_j^{(k)} - \Phi(i) \right] \quad (6)$$

where $F^{(k+1)}$, is the (k+1)st iterative magnetomotive force of node i, $F^{(k)}$, is the kth iterative magnetomotive force of node i, w is the weight coefficient, G(i,i) is the node self conduction, G(i,j) is the node mutual conduction, $F^{(k+1)}$; is the (k+1)st iterative magnetomotive force of node j, $F^{(k)}_j$ is the kth iterative magnetomotive force of node j, and $\Phi(i)$ is the flux of node i.

The term with the largest error between the last calculation and the 48 teeth magnetic density calculated each time is selected as the convergence criterion. When the difference between the teeth magnetic density calculated by two iterations satisfies $\Delta B \leq 0.5\%$, it can be considered that the iteration has converged. The rotor position is updated and the next rotor position angle is calculated. When an electric angle period is calculated, the magnetic potential of each node in the equivalent magnetic network is obtained, and the magnetic flux density on the magnetic permeability between nodes is further calculated:

$$B = \frac{(F(i) - F(j)) \times G(i,j)}{S} \quad (7)$$

where B is the calculated magnetic flux density, F(i) is the magnetomotive force of node i, F(j) is the flux potential of node j, G(i,j) is the permeability between nodes i and j, and S is the cross-sectional area of magnetization direction.

Furthermore, according to the flux density of the motor teeth, the electromagnetic characteristics of the motor, such as the flux linkage $\Phi$, the no-load back EMF E and the load torque T, can be calculated:

$$\Phi = S \sum_{i=1}^{Z} Bi \quad (8)$$

$$E = -\frac{d\Phi}{dt} = -\frac{Nd\phi}{dt} \quad (9)$$

$$T_{out} = T_{ave} + T_{cog} = \frac{mN\Phi pI\cos\theta_i}{2} - \frac{\partial W}{\partial \alpha} \quad (10)$$

where S is the sectional area of magnetization direction, n is the number of winding turns, B is the flux density, $T_{out}$ is the output torque, $T_{ave}$ is the average torque, $T_{cog}$ is the cogging torque, m is the number of phases, p is the number of poles, i is the input current amplitude, $\theta$ is the internal force angle, W is the magnetic field energy, $\alpha$ is the position angle.

Step 6, the optimization variables are selected and the optimization objective is determined, and the parametric equivalent magnetic network model is used to complete the parameter sensitivity analysis.

Figure 7A:
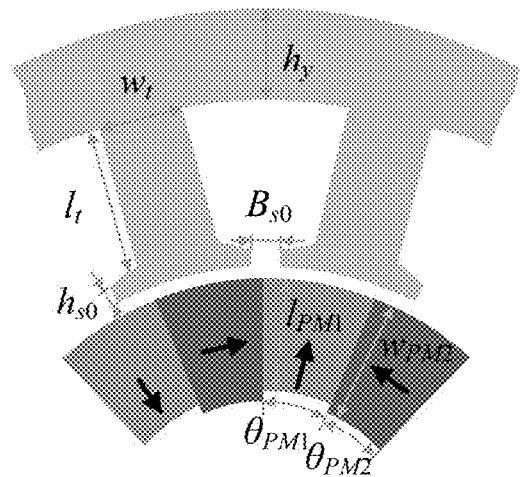

FIG. 7A is a schematic diagram of the structural parameters of the multi-objective optimization process. Through multi-objective optimization, the following eight parameters are selected; stator yoke thickness, stator tooth width, stator tooth length, pole shoe height, slot width, main permanent magnet length, auxiliary permanent magnet width and pole arc coefficient. The polar arc coefficient α is the proportion of the main permanent magnet radian $\theta_{PM1}$ to the combined radian of a permanent magnet, and $\theta_{PM2}$ is the auxiliary permanent magnet radian, which can be expressed as:

$$\alpha = \frac{\theta_{PM1}}{\theta_{PM1} + \theta_{MP2}} \quad (11)$$

For the selected eight parameters, the sensitivity analysis is carried out firstly, and the high sensitivity parameters with high influence on average torque and torque ripple are selected. Based on the output torque of the parametric magnetic network, the sensitivity analysis is carried out by using the method of one variable at a time, and the sensitivity index is further generated to express the influence of the parameters on the performance:

$$H(x_i) = \frac{V\left(E\frac{y}{x_i}\right)}{V(y)} \quad (12)$$

where $Ey/x_i$ is the average value of y when $x_i$ is a constant, $V(Ey/x_i)$ and $V(y)$ is the variance of $Ey/x_i$ and y respectively. The positive and negative indices represent that the design parameters can accordingly promote or inhibit the performance.

Figure 7B:
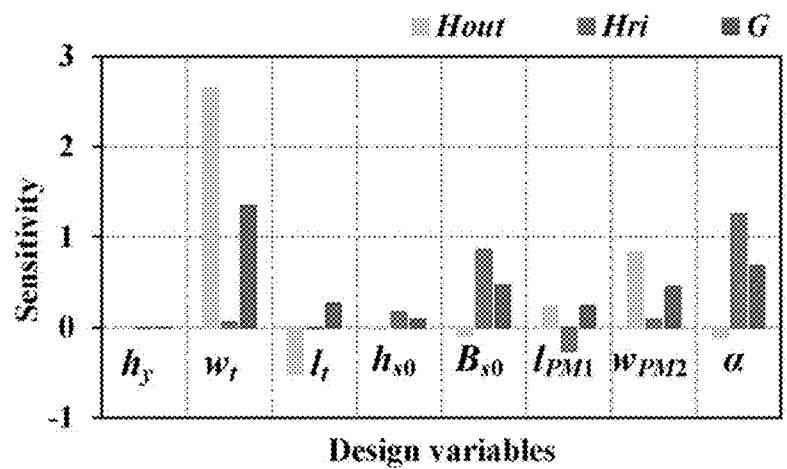

FIG. 7B is a comparison chart of single sensitivity and comprehensive sensitivity analysis of selected variables. For the selected eight parameter variables, the sensitivity analyses of average torque and torque ripple are carried out in their respective range. At the same time, based on the influence of single output, comprehensive sensitivity analysis is used to show the influence of individual sensitivity on the overall torque performance:

$$G(x_i) = \lambda_1 |H_{out}(x_i)| + \lambda_2 |H_{ri}(x_i)| \quad (13)$$

where $G(x_i)$ is the overall impacts on performance, $H_{out}(x_i)$ and $H_{ri}(x_i)$ are the sensitivity index of parameters on average torque and torque ripple respectively, $\lambda_1$ and $\lambda_2$ are the weighing factors that represent the importance, and $\lambda_1+\lambda_2=1$ is the constraint. In this work, $\lambda_1=\lambda_2=0.5$ is chosen for balance.

Step 7, high sensitivity variables are selected to establish response surface models of average torque and torque ripple respectively.

As can be seen from FIG. 7B, the tooth width, slot-opening width, auxiliary permanent magnet width and pole arc coefficient have higher comprehensive sensitivity for the comprehensive sensitivity coefficient. Therefore, these four groups of parameters are merged into high sensitivity coefficient and response surface modeling is carried out. The remaining stator yoke thickness, stator tooth length, stator pole shoe height and main permanent magnet length have relatively low sensitivity coefficients, so the single parameter optimization method is adopted. Furthermore, the response surface equations of average torque and torque ripple are established by BBD sampling with high sensitivity coefficient. Compared with CCD, BBD sampling has the advantage of less points. The key is to replace the optimization model with polynomial functions. Then the response surface equations are established by using Design Expert software. Based on the three levels of −1, 0 and 1 in BBD, EMN simulation only needs 29 sampling points. According to the response relationship between input and output, the mathematical expressions of response surface are established. However, the initial response surface models are original and needs to be adjusted for better performance. According to the correlation statistical theory, when the multiple correlation coefficient $R^2$ is close to 1, the fitting degree is better. The $R^2$ values of the two initial models are above 0.92, which indicates that the model has good adaptability and applicability. In addition, p is the result parameter of hypothesis test, the items with p value less than 0.05 are considered as the important items to improve the accuracy, and the remaining items are adjusted according to the minimum fitting deficiency. The average torque $T_{avg}$ and torque ripple $T_{rip}$ response surface models obtained after final adjustment are as follows.

$$T_{avg} = -64.05 + 25.60 w_t + 10.19 B_{s0} + 10.36 w_{PM2} + \\ 252.31\alpha - 0.56 w_t B_{s0} + 0.45 w_t w_{PM2} - 2.54 w_t \alpha + \\ 0.10 B_{s0} w_{PM2} - 7.155 w_{PM2}\alpha - 0.67 w_t^2 - 0.56 B_{s0}^2 - \\ 0.39 w_{PM2}^2 - 176.44\alpha^2 \quad (14)$$

$$T_{rip} = -22.39 + 0.89 w_t + 1.33 B_{s0} + 0.26 w_{PM2} + 57.65\alpha - \\ 0.06 w_t B_{s0} - 0.55 w_t \alpha - 0.08 B_{s0}^2 - 47.63\alpha^2 \quad (15)$$

where $w_t$ is the stator teeth width, $B_{s0}$ is the width of slot-opening, $w_{PM2}$ is the width of auxiliary permanent magnet, α is the polar arc coefficient.

Figure 7C:
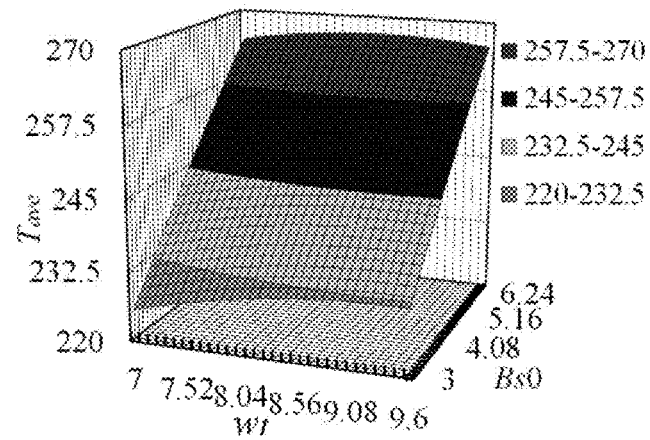
Figure 7D:
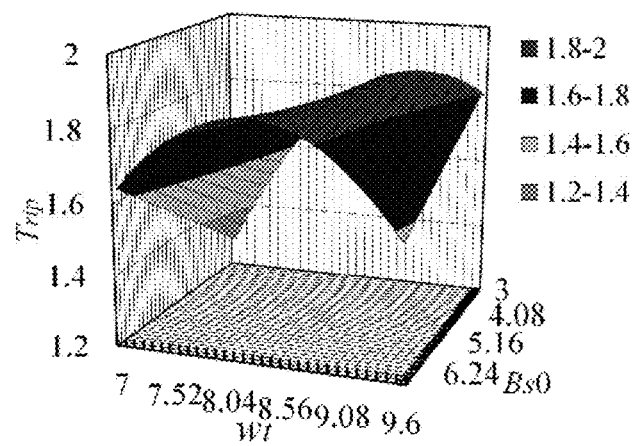

FIG. 7C and FIG. 7D are the interaction diagrams of tooth width and slot-opening width in the obtained response surface models. It can be seen from the figure that the average torque and torque ripple are nonlinear relations between variables, and the combination of their values is difficult to determine directly. Therefore, it is of great significance to use optimization algorithm for compromise design.

Step 8, the response surface model is substituted into the multi-objective optimization algorithm to obtain the Pareto front and determine the optimal parameter combination.

Based on the response surface models established above, they are substituted into the multi-objective optimization algorithm, and MODE-RMO is adopted in the present invention. The key of this model is the differential evolution of mutation operator based on sorting. MODE-RMO combines fast non dominated sorting and crowding distance, and accelerates the convergence speed. In the process of mutation, three different individual $x^g_{r1}$, $x^g_{r2}$ and $x^g_{r3}$ randomly selected from the target population and the mutation operator $m_i^{g+1}$ can be expressed as:

$$m_i^{g+1} = x_{r1}^g + F \cdot (x_{r2}^g - x_{r3}^g) \quad (16)$$

where F is the variation range interval, that is, the variation operator based on sorting, which often takes values between [0,1]. $r_1$, $r_2$ and $r_3$ are mutually exclusive integers different from i respectively.

Further, crossover processing is performed on $m_{ij}^{g+1}$, and the test vector $v_{ij}^{g+1}$ can be expressed as:

$$v_{ij}^{g+1} = \begin{cases} m_{ij}^{g+1}, & \text{if } (rand \leq CR) \text{ or } j = sn \\ x_{ij}^g, & \text{otherwise} \end{cases}, j = 1, 2, \dots D \quad (17)$$

where rand is the random value between [0,1], CR is the crossover constant between [0,1], and $x_{ij}^g$ is the selected individual.

The last step is to use greedy operator to select better individuals:

$$x_i^{g+1} = \begin{cases} v_i^{g+1}, \text{ if } v_i^{g+1} \text{ is better than } x_i^g \\ x_i^g, \text{ otherwise} \end{cases} \quad (18)$$

where $v_i^{g+1}$ and $x_i^g$ are two competing individuals respectively, and $x_i^{g+1}$ is the selected individual.

In the algorithm, population $P^g=\{x^g_1, x^g_2, \ldots, x^g_{Np}\}$ and $x^g_i=\{x^g i_2, x^g i_2, \ldots, x^g_{ID}\}$ (i=1, ..., Np) are initialized from the range of EMN variables in the search space. Furthermore, the population is sorted by fast non dominated sorting and crowding distance sorting. First, members with zero domination number will be put into a separate list Q, which belongs to the non-dominated solution set. Secondly, the crowding distance is used to analyze the average distance between two solutions, and the absolute normalized difference of two adjacent solutions is calculated to predict the population density. Finally, according to the population order, the best individual in the population will survive to the next generation. The above process is repeated until convergence and the optimal value of Pareto front is obtained.

Figure 7E:
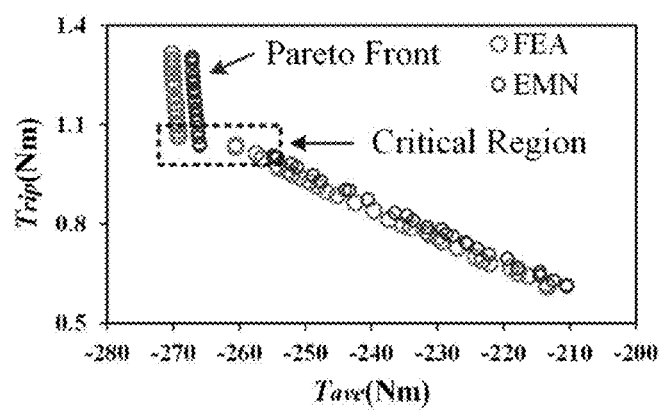

FIG. 7E is a schematic diagram of the generated Pareto front. It can be seen that the parametric magnetic network matches well with the Pareto front obtained by the finite element method. The main reason for the deviation is that the average torque obtained by EMN is less than the result of finite element analysis. The particle position includes the information of the knowledge set, and the critical area divides the high mass particles and the low mass particles. Based on Pareto front surface, the optimal average torque and torque ripple are 266.1N·m and 1.04N·m, respectively. Compared with the initial design with average torque of 252.6N·m and torque ripple of 1.87N·m, the torque performance is improved greatly.

Figure 8A:
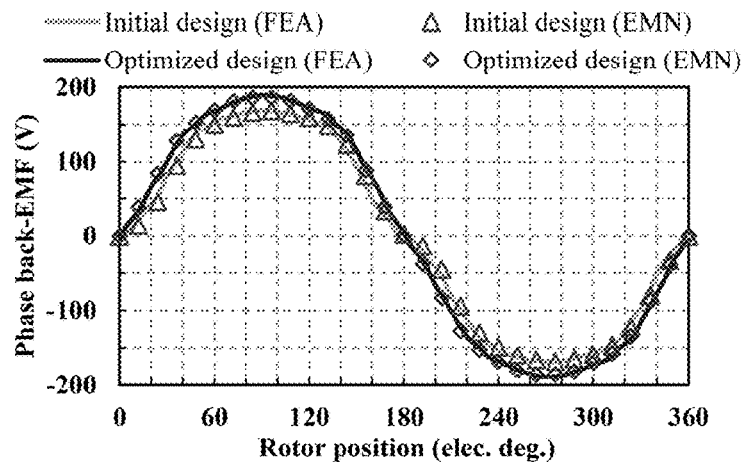
Figure 8B:
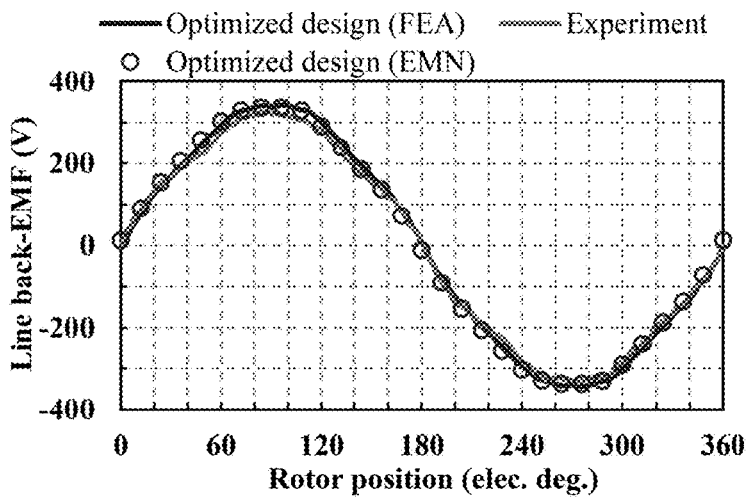

FIG. 8A is the schematic diagram of no-load back EMF comparison before and after optimization. It can be seen that the back EMF amplitude of the initial design is about 170V, and that of the optimal design is increased by about 15V. Moreover, the back EMF obtained by the finite element analysis and EMN are basically the same in the initial design and the optimal design. The difference of the peak value of the waveform is caused by the artificial error in the calculation of the equivalent magnetic circuit and the permeability of the air gap connection. FIG. 8B is a schematic diagram of the comparison with the experimental no-load back EMF. The EMN, FEA and the measured no-load line EMF are compared. Although the error in the phase potential is slightly increased in the online potential calculation, it can still be well matched and the calculation accuracy is high.

Figure 8C:
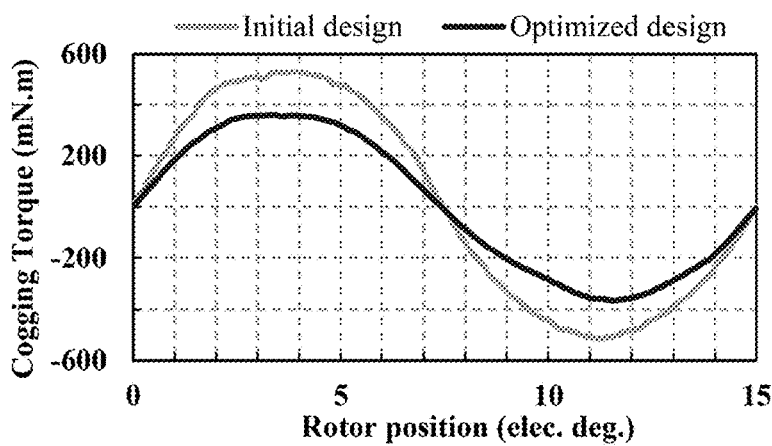
Figure 8D:
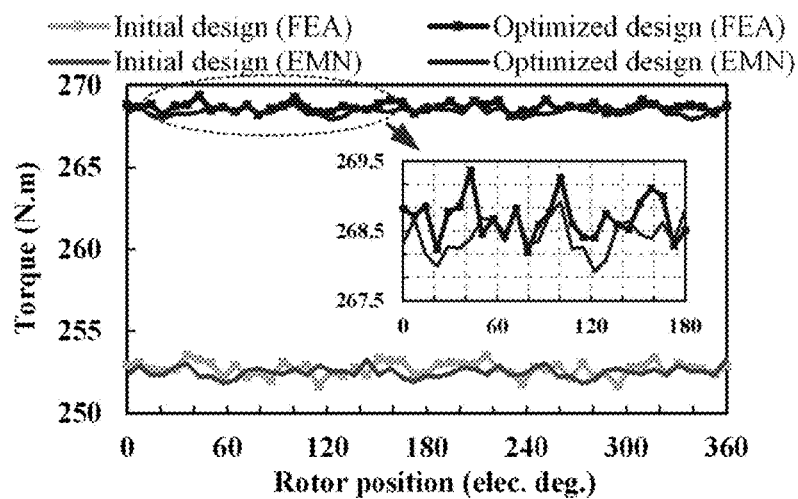
Figure 8E:
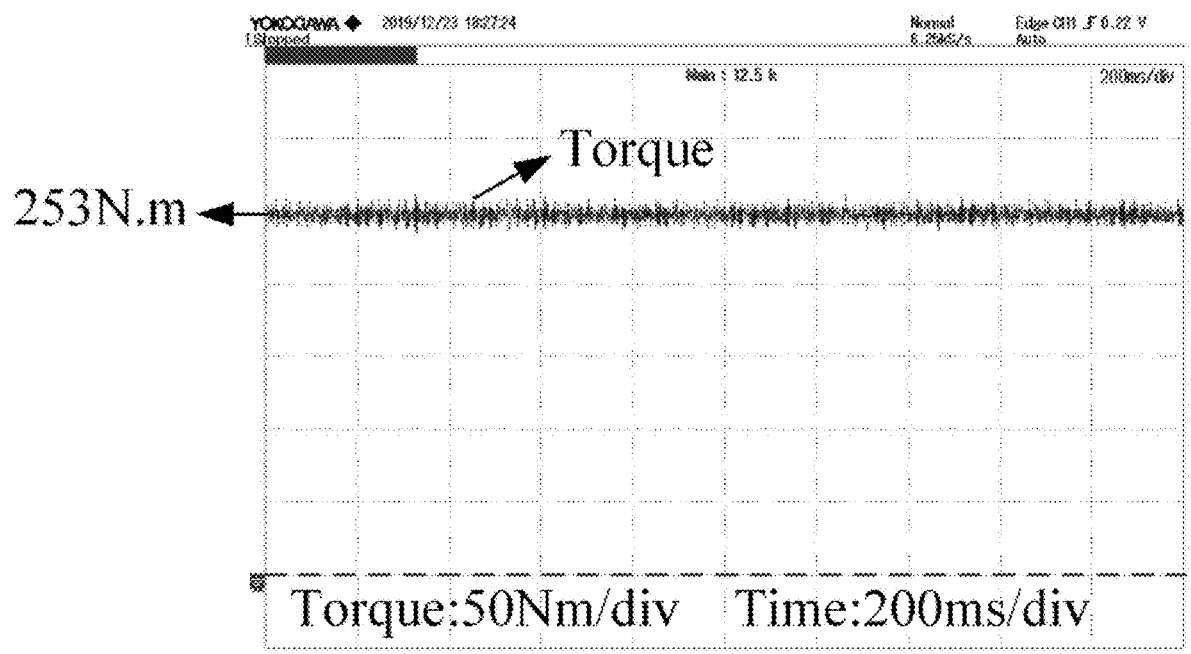

FIG. 8C is a schematic diagram of cogging torque comparison before and after optimization, which verifies the reduction of cogging torque. After optimization, the peak to peak torque ripple is reduced from 1.9N·m to 1.3N·m, which shows the effectiveness of torque ripple suppression. Furthermore, FIG. 8D is a schematic diagram of torque comparison before and after optimization. The results show that the average torque is increased from 252.6N·m to 268.3N·m, the average torque is increased by 15.7N·m, and the torque ripple is reduced from 1.04N·m to 0.71N·m. Compared with the predicted results, the torque performance is basically well predicted within the allowable error range. The main difference lies in the finite order of response surface function. On the other hand, in the initial design and optimization design, the EMN calculation results are in good agreement with the finite element analysis results in waveform and period. However, the average torque obtained by EMN is slightly lower than that obtained by FEA, which is about 0.65N·m. This is due to the difference of back EMF amplitude caused by rough mesh and fine finite element subdivision. FIG. 8E is a schematic diagram of the measured torque, showing the measured torque under rated load. The average measured torque is about 253N·m, while the average torque of EMN is about 268.3N·m. This difference is mainly caused by mechanical loss and stray loss, which are ignored in EMN modeling. Although the torque ripple in the experiment is affected by the sensor noise, it still shows a smooth output torque, which proves the effectiveness of the optimization process.

To sum up, the parametric equivalent magnetic network modeling method for multi-objective optimization of permanent magnet motor in the present invention. It includes dividing the disordered and regular regions of the magnetic flux lines in the motor, adopting the dynamic mesh with parametric characteristics for the disordered region, adopting the conventional permeability equivalent model for the ordered region, connecting the dynamic mesh model and the magnetic circuit model, and establishing the parametric equivalent magnetic network model of the motor. The torque characteristics of the motor are further obtained by solving the equations of nonlinear matrix and the magnetic potential of each node. By changing the permeance value of magnetic circuit and adjusting the shape of permeance mesh, the variable sensitivity analyses of average torque and torque ripple are carried out by using parametric equivalent magnetic network model, and the response surface models of average torque and torque ripple are established by selecting high sensitive variables. The response surface models are substituted into the multi-objective optimization algorithm to obtain the Pareto front and determine the optimal parameter combination. The results are compared with the finite element analysis and experimental results. For the first time, the parametric equivalent magnetic network modeling suitable for multi-objective optimization is carried out for surface mounted permanent magnet motor, and the scheme provided can provide reference research for modeling and optimization of this type of permanent magnet motor.

Although the present invention has been disclosed as above in a better embodiment, the embodiment is not used to limit the present invention. Without departing from the spirit and scope of the present invention, any equivalent changes or refinements are within the scope of protection defined by the appended claims.

What is claimed is:

1. A parametric equivalent magnetic network modeling method for a multi-objective optimization of a permanent magnet motor, comprising:

step 1, dividing a disordered region and a regular region of magnetic flux lines in the permanent magnet motor;

step 2, constructing a dynamic mesh model of the disordered region of the magnetic flux lines in the permanent magnet motor;

step 3, constructing a magnetic circuit model of the regular region of the magnetic flux lines in the permanent magnet motor;

step 4, connecting the dynamic mesh model and the magnetic circuit model to establish a parametric equivalent magnetic network model of the permanent magnet motor;

step 5, solving equations by using a nonlinear matrix, and solving a magnetic potential of each node to further obtain torque characteristics of the permanent magnet motor;

step 6, selecting optimization variables and determining an optimization objective, and completing a parameter sensitivity analysis by using the parametric equivalent magnetic network model;

step 7, selecting high sensitivity variables to establish response surface models of an average torque and a torque ripple, respectively;

step 8, substituting the response surface models into a multi-objective optimization algorithm to obtain a Pareto front and determine an optimal parameter combination;

step 9, generating, by the permanent magnet motor, torque and torque ripple based on the Pareto front and the optimal parameter combination.

2. The parametric equivalent magnetic network modeling method for the multi-objective optimization of the permanent magnet motor according to claim 1, wherein the permanent magnet motor is a 48slot/44pole, three-phase surface mounted permanent magnet motor comprising a stator, a rotor and an air gap;

the stator comprises a stator yoke, stator teeth, stator tooth pole shoes, stator slots between the stator teeth and armature windings in the stator slots;

a core of the stator is made of a silicon steel sheet, and the armature windings are wound in a centralized way with fractional slots;

the air gap is between the stator and the rotor;

the rotor is a coreless cylindrical structure, and the rotor comprises rotor permanent magnets and a cylindrical rotating shaft;

a surface of the cylindrical rotating shaft is slotted and attached with the rotor permanent magnets, a section of the surface attached with the rotor permanent magnets is rectangular, and a Halbach array of permanent magnets are evenly arranged on the surface of the cylindrical rotating shaft;

main permanent magnets in the Halbach array of permanent magnets are embedded in a slot on the surface of the cylindrical rotating shaft to position and install an auxiliary permanent magnet;

the cylindrical rotating shaft is made of a non-magnetic material, and is a solid cylinder;

the surface of the cylindrical rotating shaft has the slot for positioning; and the surface of the cylindrical rotating shaft is coaxially connected with the rotor permanent magnets.

3. The parametric equivalent magnetic network modeling method for the multi-objective optimization of the permanent magnet motor according to claim 2, wherein the process of step 1 further comprises:

obtaining: a magnetic flux lines distribution cloud diagram of the permanent magnet motor by using a finite element software;

the disordered region of the magnetic flux lines in the permanent magnet motor is mainly concentrated in the stator tooth pole shoes and the air gap with a plurality of spatial harmonics in the disordered region;

the regular region of the magnetic flux lines of the permanent magnet motor is mainly concentrated in the stator yoke and the stator teeth;

a distribution of the magnetic flux lines is equivalent as a distribution of magnetic flux lines in air because the cylindrical rotating shaft is made of the non-magnetic material, so the parametric equivalent magnetic network model of the cylindrical rotating shaft is not established.

4. The parametric equivalent magnetic network modeling method for the multi-objective optimization of the permanent magnet motor according to claim 2, wherein the process of step 2 further comprises:

according to a size of the stator tooth pole shoes and a size of the air gap of the permanent magnet motor, a cross-shape type permeance mesh with a variable length and width is used for mesh generations;

an influence of a magnetic flux leakage is considered at the same time;

the mesh generations for the stator tooth pole shoes and the air gap between the stator tooth pole shoes are carried out in a circumferential direction at the same time, and a mesh distribution of the two places is strictly limited to characteristics of the two places, respectively;

a size of a region boundary is set strictly according to respective region specifications, when a number of meshes is fixed, a change of a structure of the stator tooth pole shoes only affects a mesh shape of a corresponding region;

for air gap part modeling, a number and a width of a mesh in the circumferential direction is consistent with an upper pole shoe, and a height of the mesh is judged according to a length of the air gap; and when a width of the mesh of the stator tooth pole shoes changes, the width of the mesh in the air gap is updated to keep a permeance connection between an upper mesh and a lower mesh constant.

5. The parametric equivalent magnetic network modeling method for the multi-objective optimization of the permanent magnet motor according to claim 2, wherein the process of step 3 further comprises:

for the stator teeth and the stator yoke, configuring general magnetic circuit models to conduct an equivalent permeance;

wherein one single tooth is equivalent to one single permeance;

the stator yoke is equivalent by segments according to a number of the stator teeth to establish a connection permeance between the stator teeth;

for the rotor permanent magnets, a Halbach array magnetization method is used;

establishing a radial permeance in the main permanent magnets and a tangential permeance in the auxiliary permanent magnet; and connecting a permeance of the rotor permanent magnets at each node in turn according to a flow direction of Halbach array magnetic flux lines.

6. The parametric equivalent magnetic network modeling method for the multi-objective optimization of the permanent magnet motor according to claim 2, wherein the process of step 4 further comprises:

connecting bottom nodes of a permeance of the stator teeth are connected with an upper node of a stator pole shoe mesh in turn, and upper nodes of an air gap mesh between the stator tooth pole shoes are vacant;

connecting bottom mesh nodes of the air gap mesh with a permeance of the main permanent magnets in a rotor Halbach array according to a corresponding relationship;

judging whether a mapping area of the main permanent magnets on the air gap mesh is larger than half of the mapping area; and when a position of the rotor is updated, re-judging a rotation angle and resetting a connection between the air gap mesh and the main permanent magnets.

7. The parametric equivalent magnetic network modeling method for the multi-objective optimization of the permanent magnet motor according to claim 1, wherein
the process of step 5 further comprises:
establishing a matrix equation of a magnetic permeance matrix G, a magnetomotive force matrix F, and a magnetic flux matrix Φ, and calculating a magnetic induction intensity between two points according to a node magnetic potential difference with formula $B_{ij}=(F(i)-F(j)) \cdot G(i,j)/S_{i,j}$, wherein $B_{i,j}$ is a magnetic flux density between a node i and a node j, F(i) and F(J) are magnetomotive forces of the node i and the node j separately, G(i,j) is a permeance between the node i and the node j, $S_{ij}$ is a cross section area between the node i and the node j;
introducing an iron core nonlinear parameter B-H curve, and obtaining a permeability value by interpolation in an iterative calculation;
updating the permeability value by using an over relaxation iterative algorithm, and weighting the updated permeability value with a last calculated value;
when a difference between two iterations is ΔB≤0.5%, determining the iterations have converged and updating a position of a rotor for a next rotor position angle;
after completing a calculation of an electrical angle cycle, calculating electromagnetic parameters comprising a motor flux linkage Φ and a back EMF E through a tooth flux density,
under a load condition, injecting sinusoidal currents to an armature winding to generate a sinusoidal alternating tooth magnetomotive force; and
calculating an output torque of the permanent magnet motor.

8. The parametric equivalent magnetic network modeling method for the multi-objective optimization of the permanent magnet motor according to claim 1, wherein
the process of step 6 further comprises:
selecting eight parameter variables comprising a stator yoke thickness, a stator tooth width, a stator tooth length, a pole shoe height, a slot width, a main permanent magnet length, an auxiliary permanent magnet width and a pole arc coefficient;
by changing a permeability value of a magnetic circuit and adjusting a shape of a permeance mesh, carrying out variable sensitivity analyses of the average torque and the torque ripple by using the parametric equivalent magnetic network model; and
identifying four variables with high sensitivity.

9. The parametric equivalent magnetic network modeling method for the multi-objective optimization of the permanent magnet motor according to claim 1, wherein
the process of step 7 further comprises:
configuring a Box-Behnken design test method to select four high sensitivity variables for 29 times of sampling, and calculating the average torque and the torque ripple of 29 parameter combination methods in the parametric equivalent magnetic network model;
generating the response surface models of the average torque and the torque ripple in a Design Expert software;
when a multivariate correlation coefficient $R^2$ is close to 1, a p value decreases, and an accuracy of the parametric equivalent magnetic network model increases; and adjusting numbers of variables in the response surface models according to $R^2$ and the p value to improve a fitting accuracy of the parametric equivalent magnetic model.

10. The parametric equivalent magnetic network modeling method for the multi-objective optimization of the permanent magnet motor according to claim 1, wherein
the process of step 8 further comprises:
configuring the response surface models of the average torque and the torque ripple to import a multi-objective differential evolution algorithm based on a multi-objective differential evolution with a ranking-based mutation operator (MODE-RMO);
dividing external files of non-dominated solutions into branches through mutation, crossover, and selection, and analyzing an average distance between two solutions by using a crowding distance to ensure that a best individual solution survives to a next iteration; and
obtaining the Pareto front of a set of the non-dominated solutions, and determining an optimal non-dominated solution by a constraint of an optimization objective function.

11. A parametric equivalent magnetic network modeling method for a multi-objective optimization of a permanent magnet motor, comprising:
step 1, dividing a disordered region of magnetic flux lines in an air gap between a stator, a rotor, and a stator tooth pole shoe of the permanent magnet motor, and a regular region of magnetic flux lines in stator teeth, a stator yoke, and rotor permanent magnets of the permanent magnet motor;
step 2, constructing a dynamic mesh model of the disordered region of the magnetic flux lines in the permanent magnet motor by selecting different mesh generation schemes according to an actual size of the disordered region;
step 3, constructing a magnetic circuit model for the stator teeth, the stator yoke, and the rotor permanent magnets in the regular region based on the magnetic flux lines of the stator teeth, the stator yoke, and the rotor permanent magnets;
step 4, connecting the dynamic mesh model and the magnetic circuit model to establish parametric equivalent magnetic network model of the permanent magnet motor;
step 5, solving equations by using a nonlinear matrix, and solving a magnetic potential of each node to further obtain torque characteristics of the permanent magnet motor;
step 6, selecting optimization variables and determining an optimization objective, and completing a parameter sensitivity analysis by using the parametric equivalent magnetic network model;
step 7, selecting high sensitivity variables to establish response surface models of an average torque and a torque ripple, respectively;
step 8, substituting the response surface models into a multi-objective optimization algorithm to obtain a Pareto front and determine an optimal parameter combination; and
step 9, generating, by the permanent magnet motor, torque and torque ripple based on the Pareto front and the optimal parameter combination.

* * * * *